(12) United States Patent
Rowlands et al.

(10) Patent No.: US 7,171,521 B2
(45) Date of Patent: Jan. 30, 2007

(54) COHERENT SHARED MEMORY PROCESSING SYSTEM

(75) Inventors: Joseph B. Rowlands, Santa Clara, CA (US); Manu Gulati, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/182,123

(22) Filed: Jul. 15, 2005

(65) Prior Publication Data

US 2005/0251631 A1 Nov. 10, 2005

Related U.S. Application Data

(63) Continuation of application No. 10/356,321, filed on Jan. 31, 2003, now Pat. No. 6,944,719.

(51) Int. Cl.
*G06F 13/00* (2006.01)
(52) U.S. Cl. .......................... 711/141; 711/147; 711/154
(58) Field of Classification Search ................ 711/141, 711/147, 154
See application file for complete search history.

(56) References Cited

U.S. PATENT DOCUMENTS

| 6,240,501 B1 * | 5/2001 | Hagersten ................... 711/202 |
| 6,944,719 B2 * | 9/2005 | Rowlands et al. .......... 711/141 |

* cited by examiner

*Primary Examiner*—Reba I. Elmore
(74) *Attorney, Agent, or Firm*—Garlick Harrison & Markison; Timothy W. Markison

(57) ABSTRACT

A shared memory system includes a plurality of processing nodes and a packetized input/output link. Each of the plurality of processing nodes includes a processing resource and memory. The packetized I/O link operably couples the plurality of processing nodes together. One of the plurality of processing nodes is operably coupled to: initiate coherent memory transactions such that another one of plurality of processing nodes has access to a home memory section of the memory of the one of the plurality of processing nodes; and facilitate transmission of a coherency transaction packet between the memory of the one of the plurality of processing nodes and the another one of the plurality of processing nodes over the packetized I/O link.

6 Claims, 19 Drawing Sheets

| Bit-Time | 7 | 6 | 5 | 4 | 3 | 2 | 1 | 0 |
|---|---|---|---|---|---|---|---|---|
| 0 | SeqID[3:2] | | | Cmd[5:0] | | | | |
| 1 | PassPW | SeqID[1:0] | | UnitID[4:0] | | | | |
| 2 | Command-Specific | | | | | | | |
| 3 | Command-Specific | | | | | | | |
| 4 | Addr[15:8] | | | | | | | |
| 5 | Addr[23:16] | | | | | | | |
| 6 | Addr[31:24] | | | | | | | |
| 7 | Addr[39:32] | | | | | | | |

Fig. 2

| Bit-Time | 7 | 6 | 5 | 4 | 3 | 2 | 1 | 0 |
|---|---|---|---|---|---|---|---|---|
| 0 | *Command-Specific* | | | | Cmd[5:0] | | | |
| 1 | PassPW | Bridge | *Cmd-Specific* | | UnitID[4:0] | | | |
| 2 | Rsv | | Error | | | *Command-Specific* | | |
| 3 | Rsv | | NXA | Rsv | | | | *Command-Specific* |

Fig. 3

| Bit-Time | 7 | 6 | 5 | 4 | 3 | 2 | 1 | 0 |
|---|---|---|---|---|---|---|---|---|
| 0 | | | | Data[7:0] | | | | |
| 1 | | | | Data[15:8] | | | | |
| 2 | | | | Data[23:16] | | | | |
| 3 | | | | Data[31:24] | | | | |
| 4 | | | | Data[39:32] | | | | |
| 5 | | | | Data[47:40] | | | | |
| 6 | | | | Data[55:48] | | | | |
| 7 | | | | Data[63:56] | | | | |

Fig. 4

RLD Entry Format

| TAG | MODIFIED | SHARING NODES | | | | | | | |
|---|---|---|---|---|---|---|---|---|---|
| | | 0 | 1 | 2 | 3 | 4 | 5 | 6 | 7 |
| Number of bits: $35-n^a+m^b$ | 1 | 1 | 1 | 1 | 1 | 1 | 1 | 1 | 1 | a. $2n$ entry directories
b. $2m$ way set associative

Fig. 12

1- $RdS_i$ is this processor's request and $RdS_j$ is another processor's request
2- In this transaction modified cache line will be transferred from this processor to the requesting processor
3- In this transaction modified cache line will be copied to L2/MC as well.
4- There is an implicit arc from M, S, E to I for the case where the processor replaces its own copy

| Command | Virtual Channel | Description |
|---|---|---|
| cRdSh | NPC | Shared read of cache line from remote node. RLD updated. Multiple nodes can check a line out as Shared. |
| cRdEx | NPC | Read of cache line with intent to modify. RLD updated. Only one node can check a line out as Exclusive. |
| cFill | cFill | Response to either cRdSh or cRdEx. Carries 32B of data. |
| cFlush | Probe | Request by home node to current Exclusive owner to return ownership of the line and supply modified data. |
| cWB | Ack/WB | Used by remote node to return ownership of an Exclusive line and return modified data. Could be response to cFlush |
| Kill | Probe | Used by home node to reclaim lines checked out Shared. |
| KillAck | Ack/WB | Response to Kill command. Sender of KillAck invalidates copy. |

Fig. 14

Coherent Read Command (RdSh/RdEx)

| Bit Time | 7 | 6 | 5 | 4 | 3 | 2 | 1 | 0 |
|---|---|---|---|---|---|---|---|---|
| 0 | SeqId[3:2] | | | Coherency Escape Cmd[5:0] | | | | |
| 1 | PassPW | SeqId[1:0] | RSV | UnitID[4:0] | | | | |
| 2 | NodeID[1:0] | | | SrcTag[4:0] | | | | |
| 3 | Read Addr[7:5] | | | Coherent Read Sh/Ex [2:0] | | | NodeID[3:2] | |
| 4 | Read Addr[15:8] | | | | | | | |
| 5 | Read Addr[23:16] | | | | | | | |
| 6 | Read Addr[31:24] | | | | | | | |
| 7 | Read Addr[39:32] | | | | | | | |

Fig. 15A

Coherent Response (cFill)

| Bit Time | 7 | 6 | 5 | 4 | 3 | 2 | 1 | 0 |
|---|---|---|---|---|---|---|---|---|
| 0 | Reserved | | | | | | | |
| 1 | Reserved | | | Coherency Escape Cmd[5:0] | | | | |
| 2 | NodeID[1:0] | | RSV | UnitID[4:0] | | | | |
| 3 | Req. Node Addr[7:5] | | | SrcTag[4:0] (preserved from Rd) | | | | |
| 4 | Req. Node Addr[15:8] | | | | | Coherent Response [2:0] | NodeID[3:2] | |
| 5 | Req. Node Addr[23:16] | | | | | | | |
| 6 | Req. Node Addr[31:24] | | | | | | | |
| 7 | Req. Node Addr[39:32] | | | | | | | |

Fig. 15C

KillAck/WB

| Bit Time | 7 | 6 | 5 | 4 | 3 | 2 | 1 | 0 |
|---|---|---|---|---|---|---|---|---|
| 0 | Reserved | | | Coherency Escape Cmd[5:0] | | | | |
| 1 | Reserved | | | | UnitID[4:0] | | | |
| 2 | NodeID[1:0] | | RSV | Reserved | | | | |
| 3 | Probe Addr[7:5] | | | KillAck/WB Cmd[2:0] | | | NodeID[3:2] | |
| 4 | Probe Addr[15:8] | | | | | | | |
| 5 | Probe Addr[23:16] | | | | | | | |
| 6 | Probe Addr[31:24] | | | | | | | |
| 7 | Probe Addr[39:32] | | | | | | | |

Fig. 15D

| Bit Time | 7 | 6 | 5 | 4 | 3 | 2 | 1 | 0 |
|---|---|---|---|---|---|---|---|---|
| 0 | VC-category[1:0] | | Ext Buffer Free Cmd[5:0] | | | | | |
| 1 | VC3[1:0] | | VC2[1:0] | | VC1[1:0] | | VC0[1:0] | |
| 2 | · | · | · | · | · | · | · | · |
| 3 | · | · | · | · | · | · | · | · |
| 4 | · | · | · | · | · | · | · | · |
| 5 | VC19[1:0] | | VC18[1:0] | | VC17[1:0] | | VC16[1:0] | |
| 6 | Reserved (Next-Packet-To-Ack?) | | | | | | | |
| 7 | Reserved | | | | | | | |

Fig. 16

COHERENT SHARED MEMORY PROCESSING SYSTEM

CROSS REFERENCE TO RELATED APPLICATIONS

The present application claims priority under 35 U.S.C. 120 as a continuing patent application of patent application entitled A SCALABLE CACHE COHERENT DISTRIBUTED SHARED MEMORY, having a Ser. No. 10/356,321, and a filing date of Jan. 31, 2003 now U.S. Pat. No. 6,944,719.

BACKGROUND OF THE INVENT

1. Technical Field of the Invention

This invention relates generally to data communications and more particularly to high-speed wired data communications.

2. Description of the Related Art

With the continued evolution of semiconductor processing technologies, systems on a chip (SOC) are now integrating numerous embedded processors to perform a number of specialized functions. SOCs are in turn being ganged together on system boards to further leverage the processing power of the SOCs for various applications that require processing intensive performance, such as high performance networking and communications systems, servers, graphics and high-definition streaming video.

While the performance of these embedded processors continues to increase at a pace that doubles every 18 months (current clock frequencies are approaching and soon to exceed 1 GHz), the I/O process (the input and output of data between processors and other devices) continues to be a drag on the ability of systems designers to exploit these advances in processor performance. Over the years, numerous I/O buses have been developed in an attempt to facilitate the I/O process between processors and other devices. Some examples of these buses are the ISA (industry standard architecture) bus, VL-Bus (VESA (Video Electronics Standard Association) Bus), SPI, 1394, USB 2.0, 1 Gbit Ethernet, the AGP (Accelerated Graphics Port) bus, the LPC (Low Pin Count) bus, and the peripheral component interface buses PCI-32/33 and PCI-X. These buses often must be bridged together to support a varying array of devices on a chip or between chips. However, trying to integrate these buses increases system complexity, increases circuit size because additional circuitry must be devoted to arbitration bridge functions, and generally delivers less than optimal performance overall.

One relatively new approach to providing higher performance I/O processing between complex processing devices is to employ a packetized, high-speed, low-latency, point-to-point mezzanine bus protocol that can interface with legacy buses like those mentioned above, as well as next generation buses including AGP 8x, Infiniband, PCI 3.0, and 10 Gbit Ethernet. Two examples of these newer high-speed bus protocols include Rapid I/O and the HyperTransport (HT) bus, previously known as the Lightning Data Transport (LDT) bus. Revision 1.04 of the HT specification is made available by the HyperTransport Technology Consortium's web site at www.hypertransport.org. The Rapid I/O specification is available at www.rapidio.org/home.

The HT protocol uses a software transparent load/store memory mapped addressing scheme to provide an interconnect between CPU, memory, and I/O devices that is high speed, low latency, packetized and that is scalable from a Symmetrical Multiprocessing (SMP) server architecture down to desktop personal computers and embedded systems. The protocol layer includes the I/O commands, three virtual channels in which they are transported over dual, independent unidirectional point-to-point links. The links can be 2, 4, 8 or 16 bits wide. The protocol is packet based, with all packets being multiples of 4 bytes and permitting a maximum payload of 64 bytes.

All HyperTransport commands are either four or eight bytes long and begin with a 6-bit command type field. The most commonly used commands are Read Request, Read Response, and Write. The basic commands are summarized in the table of FIG. 1, listed by the virtual channel 100 within which the command 102 is transported over the HT link. The format for a Posted Sized Write command (or control packet) is illustrated in the table of FIG. 2. The format for a Response command is illustrated in the table of FIG. 3, and the format for a payload or I/O data packet is illustrated in the table of FIG. 4.

A virtual channel is an abstract connection through a single medium. An example of the implementation of virtual channels between two devices is shown in FIG. 5. Virtual channels 502 and 508 are realized by introducing separate flow controls for each abstract channel, and adding buffers 502a,b and 508a,b on each side of the physical medium 500 (i.e. a source 504 and target 506).

Because of the separate flow controls and the fact that transactions can be split into different categories, it is possible to introduce different levels of priority. Moreover, it is the means by which deadlocks are prevented. A deadlock is a condition where forward progress cannot be made due to agents conflicting with one another for resources. The classic example of a deadlock involves a circular dependency with two agents that both require the same two resources, but in a different order. If enough virtual channels are used in a system (along with their requisite buffer resources) to eliminate dependencies, deadlocks should be avoided.

The HT link has been implemented in numerous application specific topologies. One such configuration is the HT chain, one example of which is illustrated in FIG. 6. The chain is a series connection via the HT link 616 of multiple HyperTransport input/output host bridge 602 and or tunnel devices 604, 606, 610 and 612 through a host processor 602 and a single physical channel over HT link 616. Typically, all transactions are initiated by host 602 or the host bridge 608. FIG. 6 illustrates a more commercial example of an HT host processor 700 coupling the two processors 702 and 704 to a number of other tunnel devices through series HT link 716 and I/O hub 712.

Another possible application is the HT switch, where a HyperTransport I/O switch handles multiple HyperTransport I/O data streams and manages the interconnection between the attached HyperTransport devices. For example, a four-port HyperTransport switch could aggregate data from multiple downstream ports into a single high-speed uplink, or it could route port-to-port connections. A switched environment allows multiple high-speed data paths to be linked while simultaneously supporting slower speed buses.

One popular arrangement of processing resources that is particularly useful in applications requiring significant processing power, (e.g. server and mass storage applications), is a symmetric multiprocessor (SMP) arrangement that shares a memory between several processing resources over a shared multiprocessor bus (MP bus). As illustrated in FIG. 8, in an SMP system 800 (sometimes integrated as a system on a chip (SOC)), the physical memory 812 is both physically and logically contiguous. All of the processing units 802, 804, 806 and 808 can access any location in the memory with virtually uniform access times over the MP bus 814.

SMP systems also typically incorporate instruction/data caches 832, 834, 836 and 838 to buffer."mostly accessed" instruction/data. This decreases the time required to access this instruction/data by avoiding a memory access to the larger and therefore much slower memory resource 812 most every time it fetches instructions and data (usually implemented off-chip as dynamic random access memory (DRAM)). To exploit the spatial locality of instructions and data, cache memories are designed to bring instructions/data from the memory resource in blocks or lines. Typically, the memory content is updated on a block by block basis. A level two (L2 cache 210) cache may also be implemented on chip to further reduce the number of accesses to the off-chip memory 812.

One of the additional complexities characteristic of SMP systems, where each processor caches blocks of content from the memory resource, is that of coherency. That is, if two of the processors 802, 804, 806 808 cache the same data line in their caches 832, 834, 836 838 respectively, and then one of the processor wants to update its own copy, then the other processor will read stale data if it reads its version of the line in its cache after the update. To prevent this from occurring, coherence protocols are typically implemented over the MP bus 814 to ensure that the data is ultimately always coherent within the shared memory 812.

Applications such as server and high-speed communications systems continue to demand more processing power. The SMP architecture, however, does not scale well above a certain number of processing units because the link (typically a shared multiprocessing bus) that endeavors to service the memory accesses for all of the processors with equal access to the entire memory becomes a bottleneck. Not only doe the MP bus 814 service the memory access requests of all of the processors, but it also must handle I/O traffic that is initiated by the chip and that must be transported between the processing units and I/O buses and/or devices on or off chip (not shown).

To scale processing resources even further to achieve greater processing power, an alternate multiprocessing architecture is often employed called non-uniform memory access (NUMA). This architecture provides a processing resource with its own locally associated physical memory, but also provides that processing resource access to the local physical memories of all of the other processing resources in the system as well. The memory access is non-uniform, as opposed to the SMP architecture described above, because the access time seen by a processing resource will be significantly shorter for local memory accesses than it will be for remote accesses made to the local memories of other processing resources. This architecture is also known as a distributed shared memory (DSM) system, because while the memory is physically broken up into separate local physical memories, they are shared logically as a contiguous memory from the perspective of each processing resource in the system. A representative DSM architecture is illustrated in FIG. 1.

Thus, each processing node 901, 903 and 905 can have an SMP processor resource 908, 910 and 912 coupled to its own physical memory 902, 904 and 906 respectively. Each processing node is coupled through an I/O port of its processor (not shown) to an interconnect fabric 914. Because the whole memory (i.e. the combination of memory resources 902, 904 and 906) is seen as logically contiguous by each processor 908, 910 and 912, each processor can access any shared memory location by simply using the logical address of that location, which is mapped to a physical location within one of the physical memory resources 902, 904, 906. Thus, each processor can access its own local physical memory resource directly (i.e. within its home processing node), or it can access data lines within the memory resources of remote processing nodes through the interconnect fabric. The home node is therefore responsible for its own section of the entire logical memory space and all read/write requests to a logical address that maps to its section will be sent to and processed by that node.

Even greater processing capability can be achieved if the SMP architecture as generally described in FIG. 8 is implemented on a first level (often the chip level), with the DSM NUMA architecture being implemented between the SMP chips on an inter-chip level. Thus, the processor resources 902*a–c* of the NUMA architecture of FIG. 9 can be implemented as the SMP processor systems 800 of FIG. 8, with the physical memories 912*a–c* of the NUMA architecture in FIG. 9 each being equivalent to the memory 812 in FIG. 8. The memory buses 940*a–c* of the NUMA architecture in FIG. 9 are equivalent to the memory bus 940 of the SMP system 800 in FIG. 8.

Of course, the complexity of maintaining coherence between cache and memory becomes significantly greater two-tiers of coherency must be maintained. Not only does the coherence have to be maintained on the SMP multiprocessor system level (i.e. intranode cache coherence), it must also be maintained between the processing nodes 900*a–c* at the NUMA level of the architecture (internode cache coherence). Those of average skill in the art will recognize that the SMP system 800 of FIG. 8 will also have one or more I/O ports (not shown) by which the SMP system 800 can communicate with external processing and I/O devices.

The I/O ports required of the SMP architecture on the intranode level as a result of their implementation within a two-tired multiprocessing scheme are more sophisticated as they provide an interface by which the status of memory blocks are lent to remote nodes by way of internode coherent memory transactions. This interface must also be able to translate internode level coherent memory transactions into the requisite local intranode coherent memory transactions, especially when the two coherency protocols are not identical.

Clearly, between the sheer volume of I/O and coherent memory transactions that must be serviced between the nodes, a bus that does not have sufficient bandwidth would quickly degrade the throughput of the structure and mitigate the advantage of processing power the architecture might otherwise provide. The DSM NUMA architecture of FIG. 9 could therefore benefit from the implementation of the interconnect fabric 914 as a high speed packetized I/O link such as the HT link described above. However, for the processing nodes to access memory data lines from anywhere in the distributed memory, the packetized I/O link must be able to transport coherent memory transactions necessary to maintain coherency between the various physical memories associated with each of the processing nodes.

At present, the HT packetized I/O bus protocol does not support the transport of coherent memory transactions. Therefore, a need exists for a high speed packetized I/O link that can transport the coherency transactions necessary to implement a two-tiered NUMA multiprocessing system, while meeting the bandwidth requirements necessary to leverage the speed at which the processing resources of such systems can presently operate and at which they will operate in the future. There is further a need for an interface between such a packetized I/O bus and the processing nodes coupled thereto by which coherency at the node level can be maintained and by which coherent memory transactions at the internode level can be translated to coherent memory transactions at the intranode level and vice versa.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 2 is a table illustrating the request command packet format specified for the HT link;

FIG. 3 is a table illustrating the response control packet format specified for the HT link.

FIG. 4 is a table illustrating the data packet format specified for the HT link.

FIG. 12 is a table illustrating an entry to an RLD of the present invention.

FIG. 14 is a table describing the internode cache coherency commands of the invention.

FIG. 15A is a table illustrating the packet format for a Coherent Read Command of the present invention.

FIG. 15C is a table illustrating the packet format for a Coherent Response command of the present invention.

FIG. 15D is a table illustrating the packet format for a Coherent KillAck/WB command of the present invention.

FIG. 16 is a table illustrating the packet format for a Buffer Free message packet of the present invention.

DETAILED DESCRIPTION OF THE INVENTION

Figure 8:
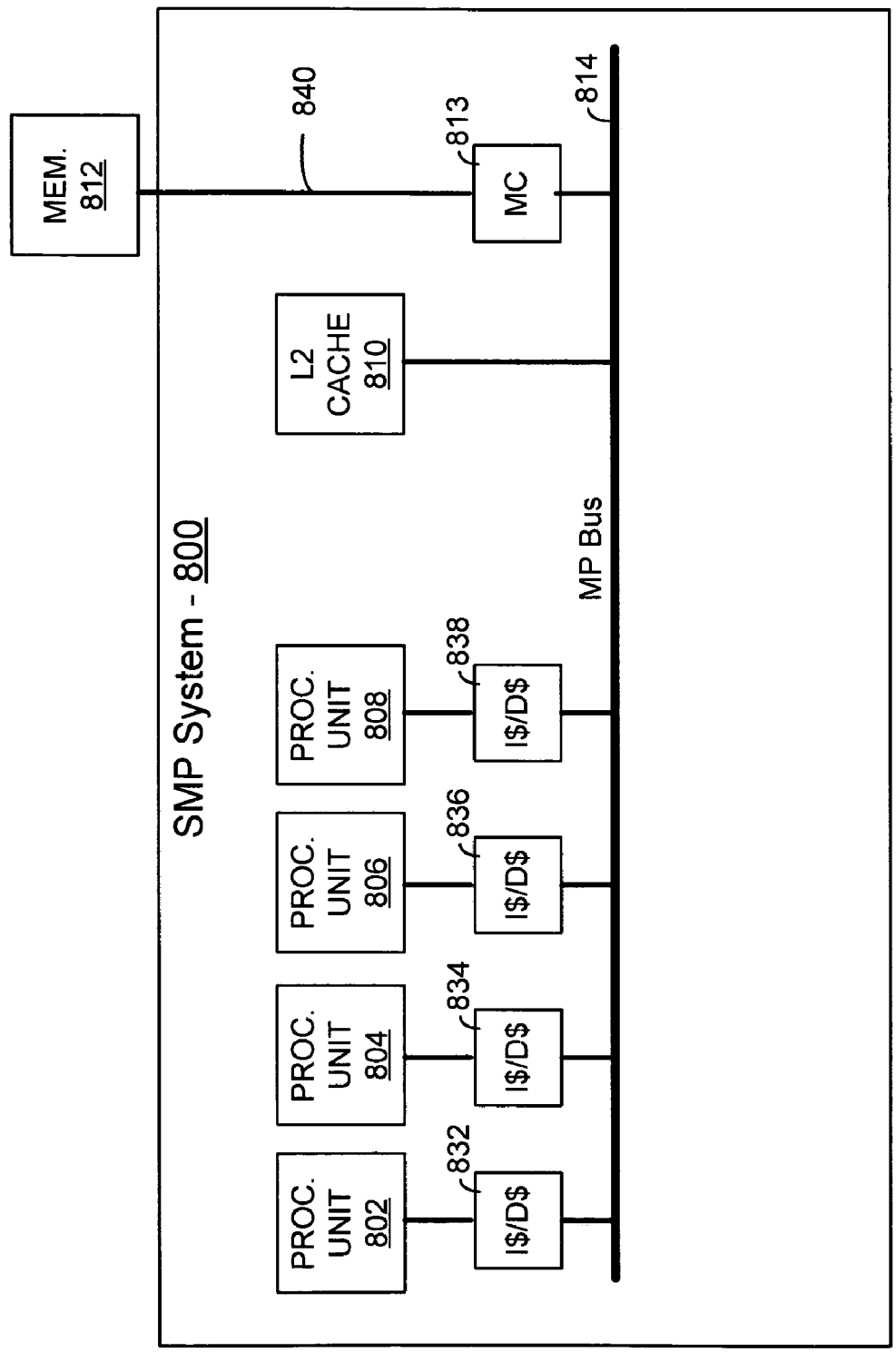
FIG. 8 is a schematic block diagram illustrating an SMP SOC architecture.
Figure 9:
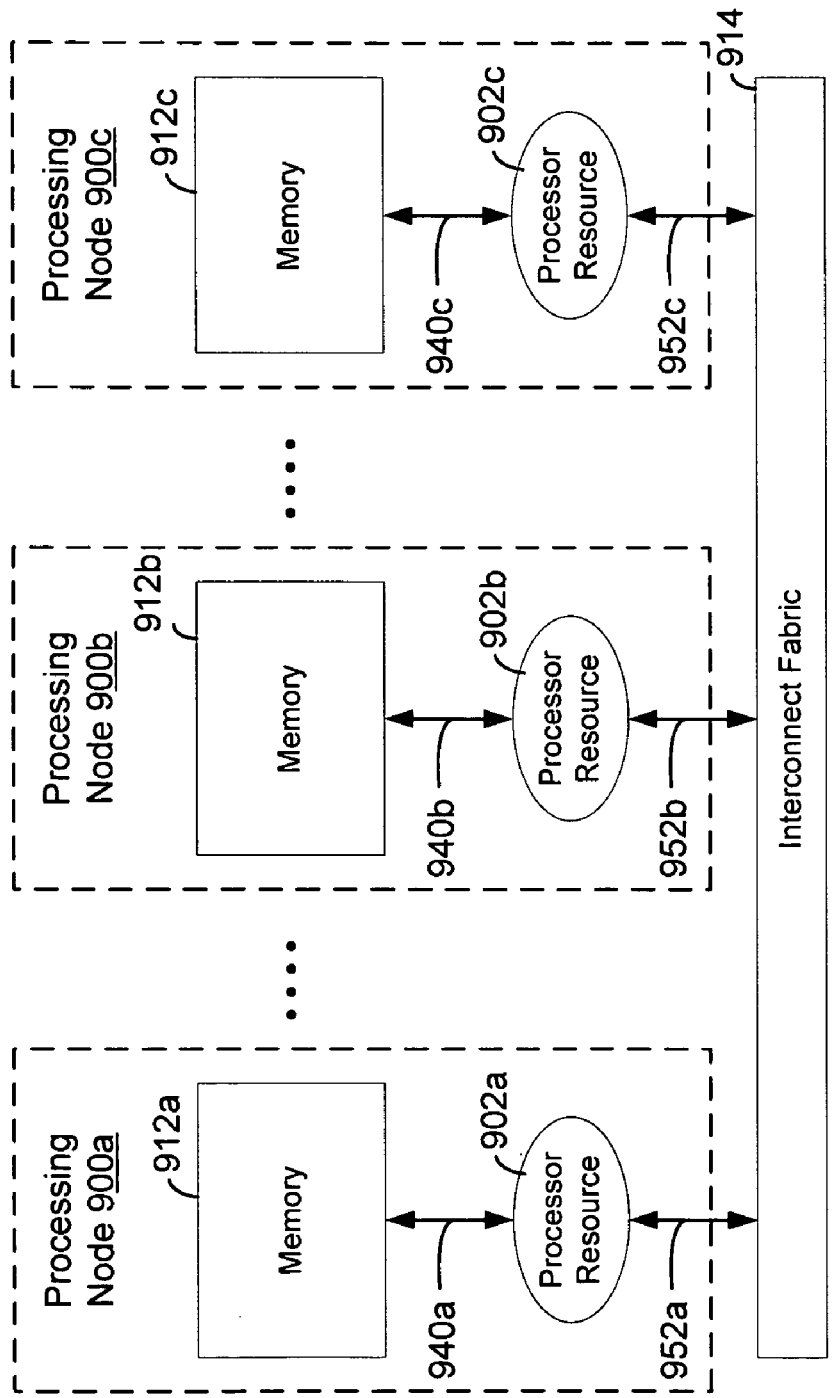
FIG. 9 is a schematic block diagram illustrating a NUMA DSM architecture in accordance with the present invention.
Figure 10:
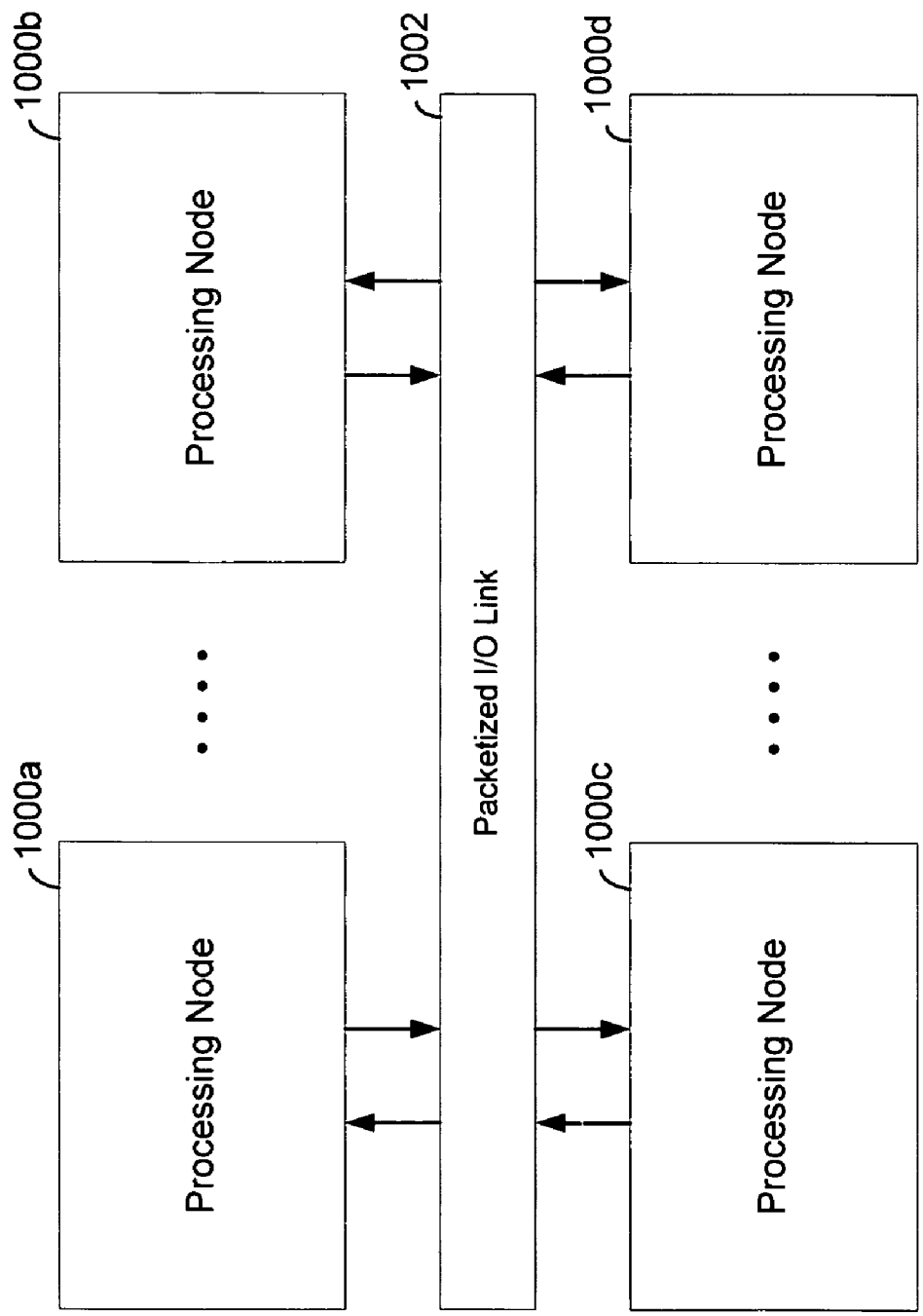
FIG. 10 is a schematic block diagram of a DSM architecture of the present invention that incorporates a high-speed packetized I/O link.

To implement the NUMA architecture of FIG. 2 with SMP processing systems such as those illustrated in FIG. 8 substituted as the processing resources 902a–c of the FIG. 9, the processing nodes 900a–c must be able to communicate coherent memory transactions between one another over the interconnect fabric 914. In one embodiment of the invention, as shown in FIG. 10, the interconnect fabric is a high-speed packetized I/O link 1002, such as a HyperTransport (HT) link. In the present invention the high-speed packetized I/O link protocol has been expanded to carry coherent memory transactions, along with regular I/O transactions. This permits implementation of a requisite MSI internode coherency protocol between the processing nodes 1000a–d not heretofore implemented or defined in the specifications of any packetized I/O link.

Two levels of cache coherency are required. In one embodiment of the DSM system of the invention, the two levels of coherency, in conjunction with one another, ensure that there is only one owner for each cache block at any given time in the entire DSM system. Only the owner is permitted to modify a cache block, and if there is more than one copy of a block (or line) existing within the system, then all of those copies must be identical and read only copies.

In one embodiment of the invention, two different protocols are used. The first level intranode protocol is used for maintaining the cache coherency between the processors on the same node (i.e. within each SMP processing resource 902a–c, FIG. 9) and the second level protocol is used for internode cache coherency across multiple nodes 900a–c of FIG. 9. The intranode protocol is a snooping protocol and the internode protocol is a directory-based protocol. The intranode cache coherency protocol is based on a protocol which defines the possible states of cache lines to be Modified, Exclusive, Shared and Invalid (MESI). The internode cache coherency protocol is based on a Modified, Shared, and Invalid (MSI) protocol, with each home node controlling the global state of its associated (i.e. local) memory blocks. As previously discussed, a home node can be defined as the node for which particular memory blocks are locally associated.

Figure 11:
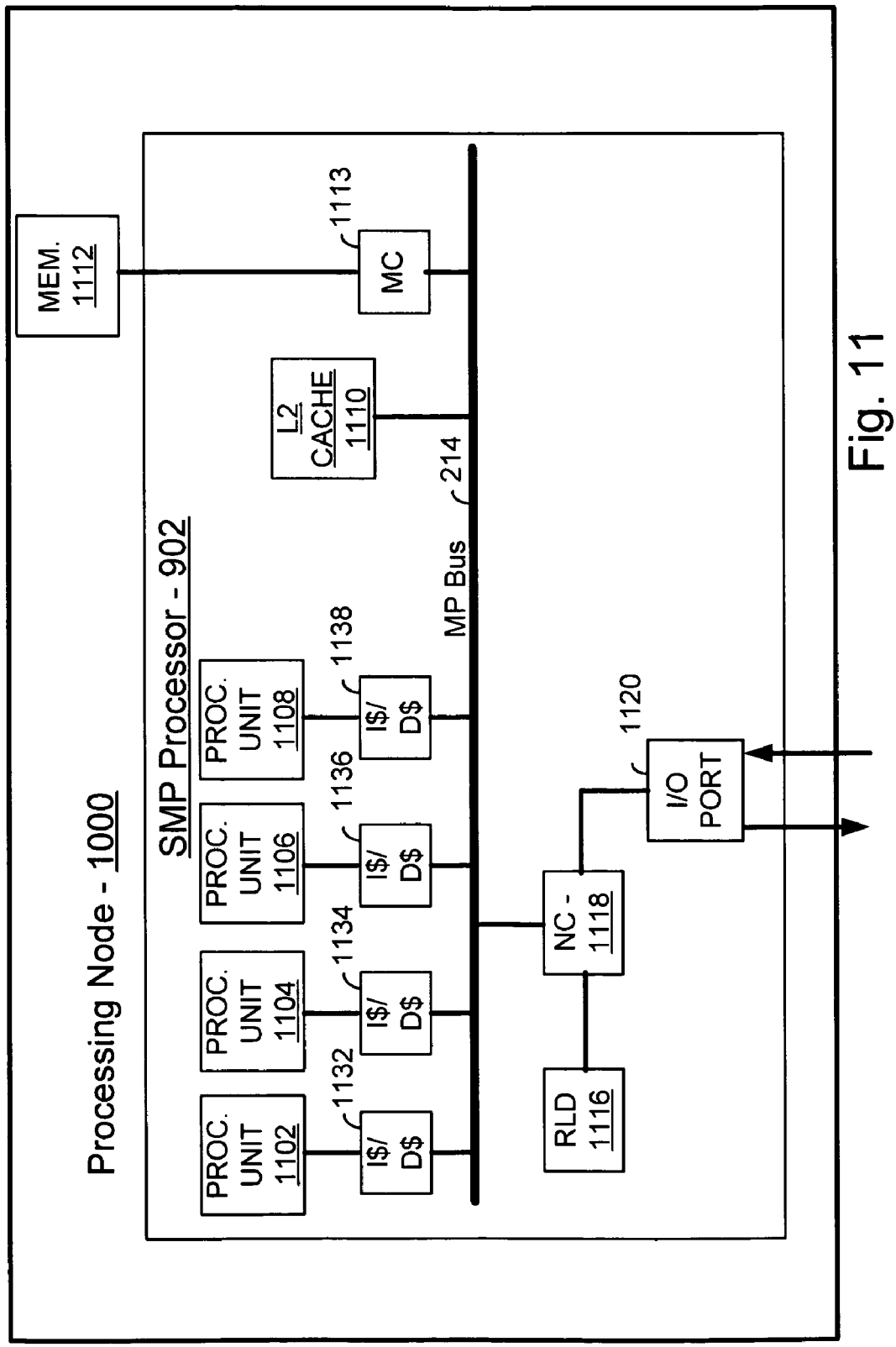
FIG. 11 is a schematic block diagram illustrating an SMP SOC architecture of the present invention implemented as a processing node of the NUMA DSM architecture of FIGS. 9 and 10.

To support these two levels of coherency, the SMP processing resource of the invention, as illustrated in FIG. 11, must have additional resources over the SMP system of FIG. 8. In one embodiment of an SMP system of the present invention, a remote line directory (RLD) 1116 and a node controller (NC) 1118 are coupled between an I/O port 1120 and the internal processor bus (MP bus) 1114. The RLD 1116 is a mechanism by which each node 1100 maintains a global state for all of the memory blocks that it has lent out to the other nodes as remote nodes. The global state indicates whether the block is "clean" or "dirty" and if it is "clean" which processors have a copy of it, if any. The NC 1118 is a special directory controller that controls the global states of blocks in its associated memory. Remote requests for ownership of its cache lines are received and serialized at each NC 218 to ensure that only one owner for each line will exist. The NC 1118 also performs translations between the first level intranode coherency commands and the second level internode commands that are actually transported over packetized I/O link 1002, FIG. 10.

In most directory based cache coherence protocols the state of all memory blocks are maintained, but such a directory can be large commensurate with the size of the distributed memory. In one embodiment of the present invention, a full directory map of the entire system is not used. Instead, each home processing node keeps the directory of the cache lines that are fetched by other nodes. Typically, there is a relatively small number of cache lines shared at any one time, and therefore limiting the status ensures a directory small enough to be integrated onto a single SMP chip.

Figure 1:
FIG. 1 is a table illustrating the commands and virtual channels specified for I/O transactions over an HT link.
Figure 5:
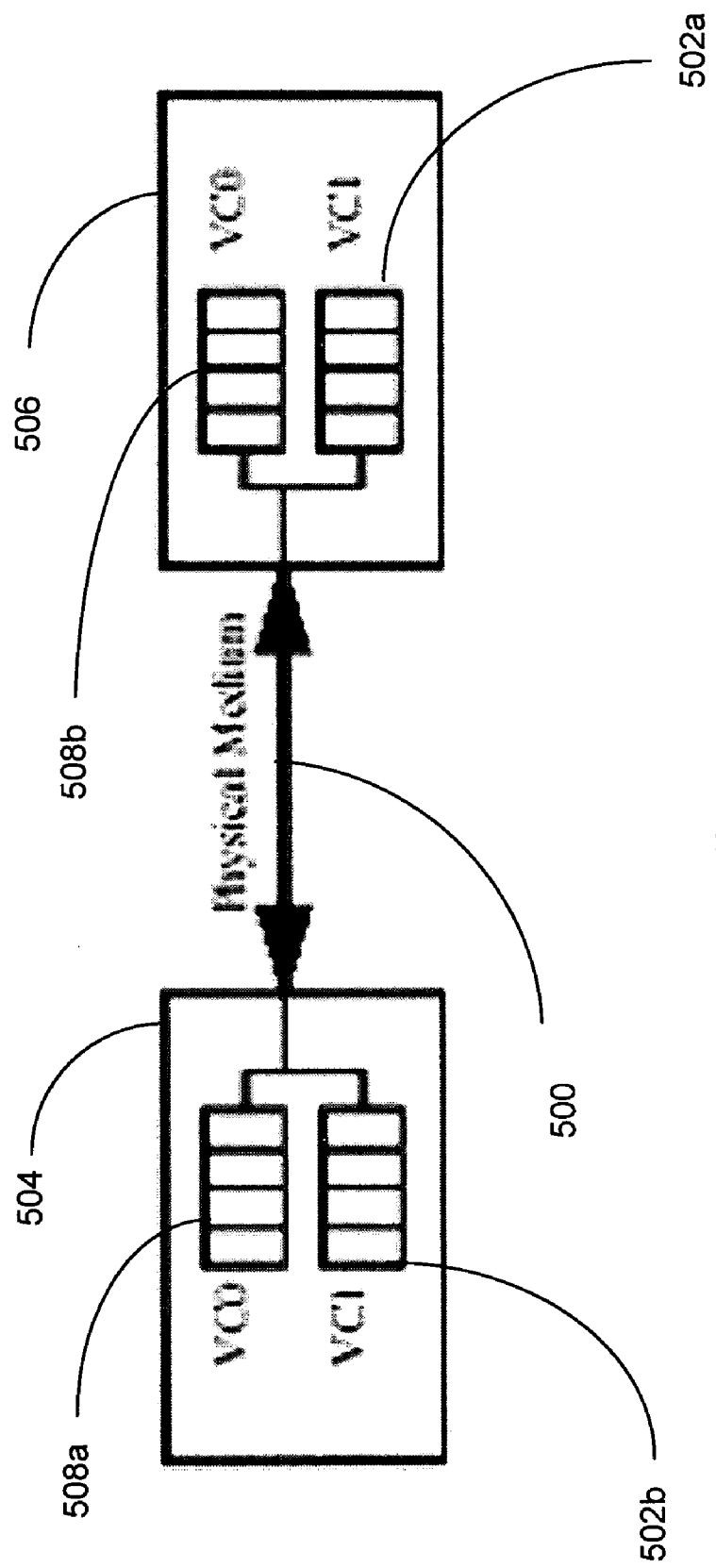
FIG. 5 is a schematic block diagram illustrating the physical resources used to implement virtual channels over a single connection.
Figure 6:
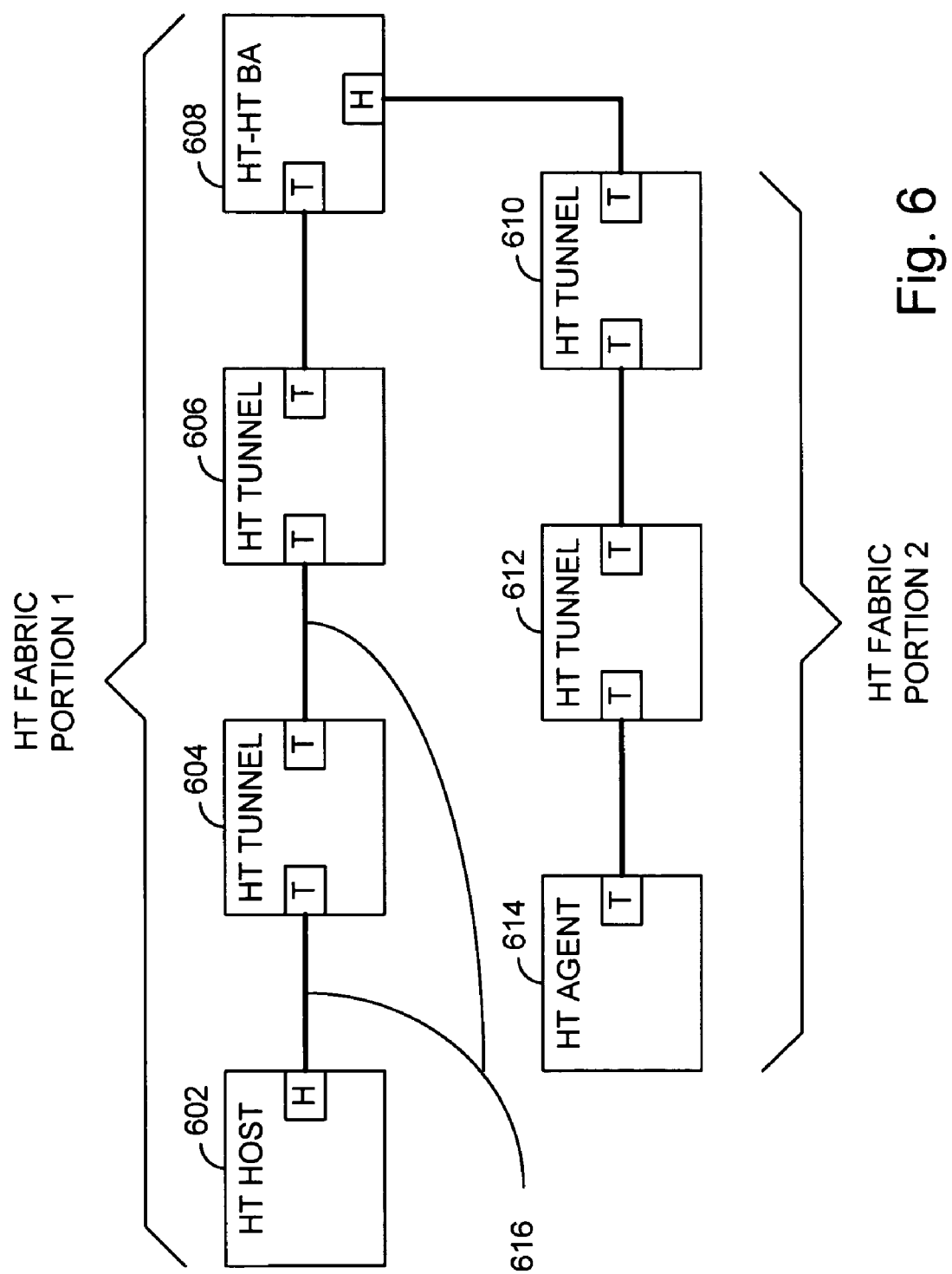
FIG. 6 is a schematic block diagram illustrating an HT fabric that is an HT chain.
Figure 7:
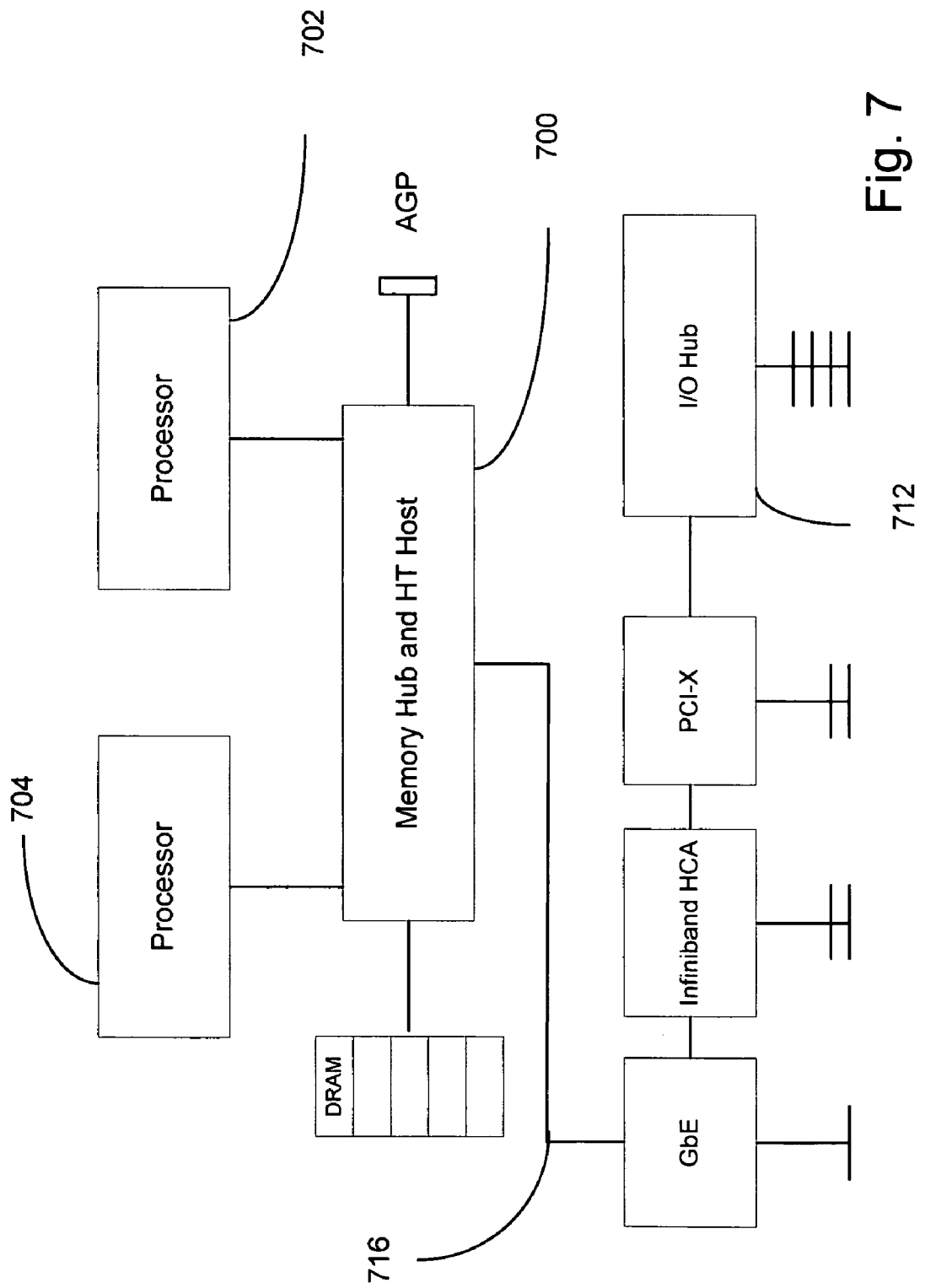
FIG. 7 is a block diagram illustrating one possible application of the HT fabric of FIG. 6.

As is illustrated in FIG. 5, each entry 1200 of the RLD 1116 contains a tag 1102 to determine to which memory block the directory entry 1200 belongs, a modified bit 1204 which, when set, indicates that this line is modified by a remote node, and a group of "sharing node bits 1206. These bits, when set, represent which nodes have a copy of this line. If the modified bit 1204 is set, then only one node can have its shared bit 1206 set and if this entry is invalid, then all shared bits 1206 will be reset. In one embodiment of the invention, RLD 1016 is organized like an n-way associative cache to reduce conflicts between different directory entries 1200 in the RLD 1116. Further details of the operation of the NC 1118 will be discussed below subsequent to a description of the first and second level coherency protocols. In one embodiment of the invention, the first level intranode coherency protocol is implemented as described below. All agents of the processing nodes 1000a–d, which include the processing units 1102, 1104, 1106 and 1108 (through their) instruction/data caches (I$/D$) 1132, 1134, 1136 and 1138 respectively), the L2 cache 1110, the memory controller MC 1113 and NC 1118 as shown in FIG. 11, are connected to a split transaction MP bus 1114. The MP bus 1114 is used by the foregoing agents to maintain the intra-node cache coherency protocol of the invention.

Figure 13:
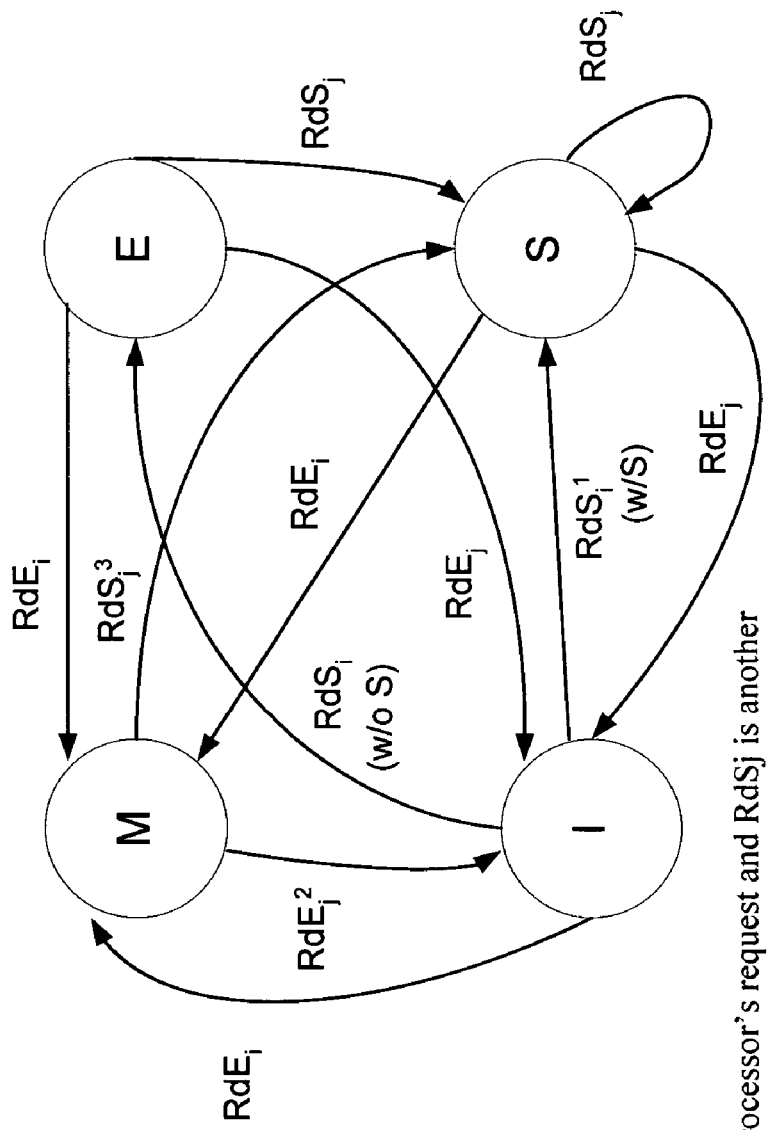
FIG. 13 is a state diagram illustrating the intranode cache coherency protocol implemented in the DSM system of the invention.
Figure 15B:
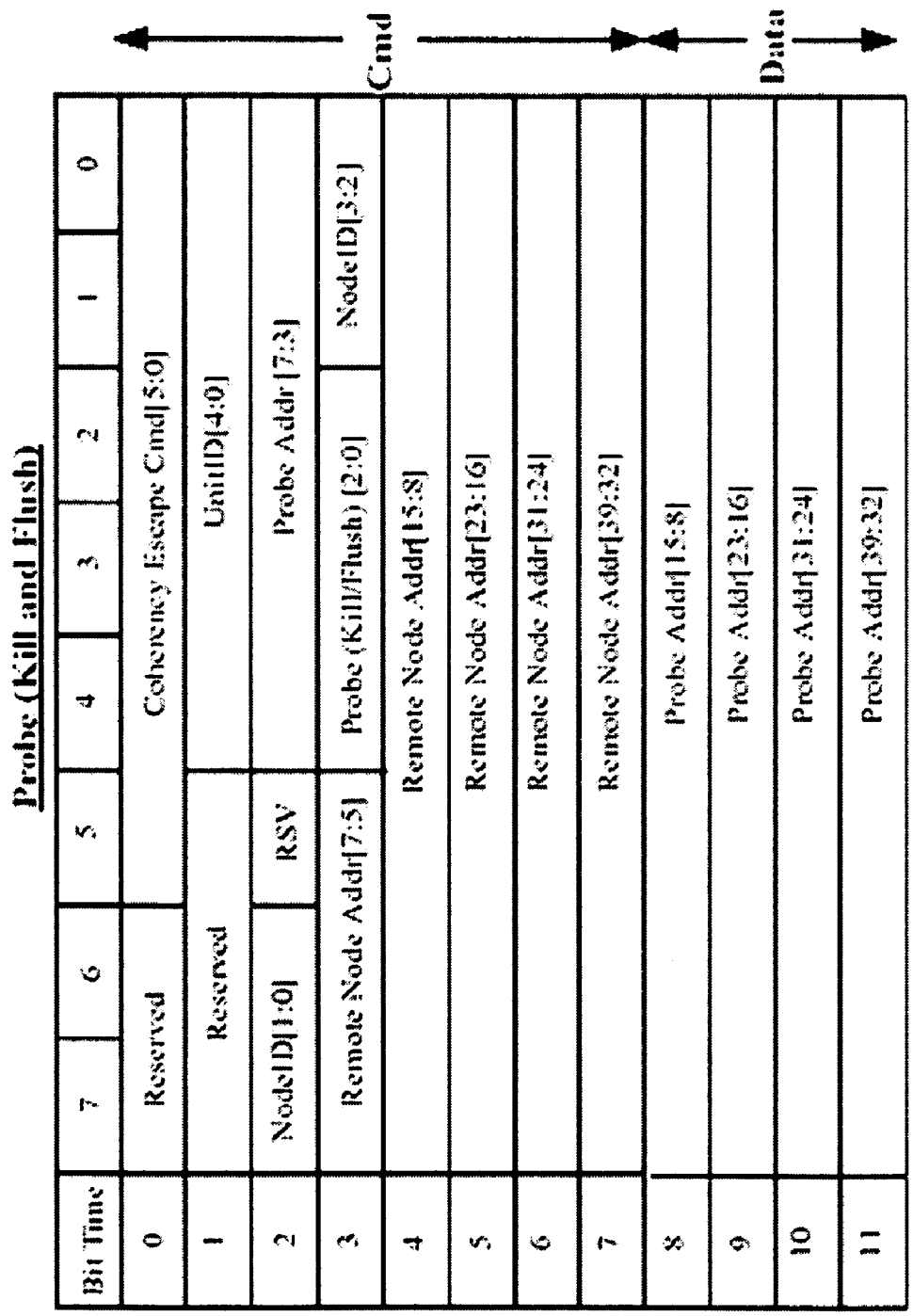
FIG. 15B is a table illustrating the packet format for a Coherent Probe command of the present invention.

Each agent implements the MESI protocol and also snoops the MP bus 1114 to observe transactions that may affect the state of its cached block copies. A load/store request at an agent may generate a coherence action. Subsequently, a command will be issued to the MP bus 1114 by the agent. All other agents will snoop the MP bus 1114, check their own cached copies and respond with the state of their cached copies. Each agent then will update the state of their cached copies based on the MESI protocol state diagram shown in FIG. 13. If any of the other agents is the owner of the block, it will supply the data. If there is no owner, the MC 1113 will supply the data.

The L2 cache 1110 controller (not shown) works a little differently than the other agents on the MP bus 1114. In intranode coherency it acts like a memory cache, caching the lines fetched from the memory 1112. It also snarfs write backs (WBs) from agents or cache to cache transfers between agents.

As mentioned before, in one embodiment of the invention the MP bus 1114 is a split transaction bus and has the following three phases: the A-phase=Address transfer; the R-phase=Coherent response; and the D-phase=Data tenure. The A-phase is the cycle that a master (after winning a distributed arbitration) drives its address and its command on the MP bus 1114. The A-phase provides an ordering point for intra-node data transactions. The R-phase is the cycle during which the coherent response is driven by targets. Responses are the state of a current line in each responder. For example if the L1 contains the line in the "S" state, it responds "S" independent of the snooped transaction type. Similar responses exist for the other cache states: "E", "M" and of course "I".

During the D-phase data is driven either by a master (in the case of a write transaction) or by a target (in the case of a read). Also in the D-phase it is determined whether the cache block is dirty or not.

One embodiment of the second-level or internode coherency protocol of the DSM system of the invention is implemented as described by the following. As previously discussed, the home node is the processing node 900a–d (FIG. 9) for which the memory space (i.e. space mapped to the local memory controller MC 11113) contains a given cache line of data. The home node is the home of the cache line. The home node is the place from which ownership of this particular line is transferred to other remote nodes. On the MP bus 1114, each agent has an address map that specifies which areas are local memory owned by this node, and which memory area is remote memory.

A remote node is the opposite of a home node. It specifies the nodes that do not contain this line in their memory controller space. Although there is only one home node, there are possibly multiple remote nodes. The home node doesn't distinguish between agents in remote nodes. The home node distinguishes between the nodes 900a–d. The home node provides data in either Shared or Modified form to a node 900, not an agent within the node. When it issues a probe transaction to retrieve ownership of the cache line, the home node issues it to a remote node. Agents are only identified within their own processing node 900.

If a node wants to access a remote line, it makes a request to the home node for that line. A remote node never makes a request of another remote node. Once a remote node acquires a cache line, the cache line can be passed around internally to the different agents within the acquiring node. The remote node must maintain coherency, though. Thus, a node 900 can be both a home node, and a remote node, depending on what memory line address is being referenced.

The intranode coherency model is the coherency supported on the MP bus 1114. It has four coherent states: Modified, Exclusive, Shared, and Invalid. For purposes of ownership, the Exclusive and Modified states are the same. If a read to a cache line that is already held in either of these states is performed, the owner is responsible for providing the data.

The L2 cache 1110 does not follow the MESI protocol, but provides support for its use. It has three states, Invalid, Valid, and Dirty. If no other agent has ownership of the line, and it is valid or dirty in the L2 cache 1110, the L2 cache 1110 will provide the data. It is possible that the L2 cache 1110 is dirty with respect to memory, while the CPU of processor unit 1102, 104, 106, 1108 has the line in a Modified state as well. The CPU has the most recent copy of the data and therefore is "dirtier" in state than the line held in L2 cache 1110.

Ownership is transferred in the Response phase of the MP bus 1114. An agent can acquire ownership of a line before it actually acquires the data. If snooped before the data is present, it sets up a link to the requester, and provides data after it gets it. It guarantees forward progress by using the data once before passing it on. This can be in the form of a read or a write. When an agent requests a particular line, it gets a copy of the data in a clean state with respect to memory. This means that if an agent-to-agent transfer occurs (due to a snoop while in the exclusive state), the L2 cache 1110 or MC 1113 is required to pick up a copy.

As previously stated, for internode coherency, there are only three states: Modified, Shared, and Invalid. It is not permitted for a processing node 1000 to acquire a remote line in the Exclusive state. This is not permitted because Exclusive lines are allowed to be silently dropped. Requiring the remote node to send the line back reduces the number of possible states in the system.

When a line is transferred to a node 1000 as either Exclusive or Shared, it is Exclusive or Shared to that node 1000, not to the processor that sent the request. This means the agents on the chip must work together to ensure that the line remains in the proper state. The system has two ordering points, where ownership is passed. Normally there is a need for a single point of ownership transfer, but because legacy parts must be considered, there are two. The first ordering point is the MP bus 1114 of the agent making a request. In a single node system, typically this is the only ordering point. As agents request lines, the ownership is transferred intranode according to the protocol of the MP bus 1114.

In a multi-node system, each node 1000 determines the ownership among its different agents, and makes sure coherency is maintained. The second ordering point is the home node MP bus 1114 of a particular line. If multiple nodes are trying to obtain a copy of a line, they make requests to the home node, and ownership is transferred according to the order they appear on the home node's MP bus 1114. In addition to the remote nodes, the home node agents also use this as their ordering point. The remote nodes look like agents on the bus.

The cache line can be borrowed by a remote node in either the Modified or Shared state. If taken in the Shared state, the remote node is not allowed to modify it. The agents in that remote node can share the line, but no modification may occur. Further, the line is allowed to be silently dropped without alerting the home node. Because there is no guarantee the data will be at that node, it is not responsible for providing the data.

If the line is borrowed in the Modified state, that borrowing node has ownership. It can share the line among the agents in that processing node, or it can give an exclusive ownership to a single agent, so that it can be modified intranode. The processing node 1000 is not allowed to silently drop the line. This means it really does have ownership of it, and must eventually provide the data back to the home node. This happens upon either an eviction from the processing node 1000 or in response to a cFlush command from the home node.

NC 1118 is an agent on the MP bus 1114 that is responsible for implementing a large part of the internode coherency protocol. It acts as a liaison between the external nodes and its own home node. Because the MP bus 1114 is the ordering point, the NC 1118 is responsible for translating external coherent commands into MP bus 1114 commands, and vice versa. Further, the NC 1118 is responsible for issuing commands to external nodes in order to facilitate the coherency protocol. Because there is no globally visible point in the system, the NC 1118 is responsible for providing commands to the external agents to maintain ordering. For example, if a local agent in the home node requests a cache line that is already being shared remotely, the remote agents must invalidate their copy. The NC 1118 is responsible for issuing the invalidation commands to initiate that transaction. Part of this responsibility is tracking the status of lines as they are borrowed by remote agents. As previously discussed, this is accomplished through the RLD 1116.

As previously noted, each home node must keep track of local cache lines that it lends out to other nodes in the process of maintaining coherency. To track these lines as they go remote, the address of the line being sent out must be tracked. Also, the ID of the node that is borrowing the line must be tracked to get the line back. Finally, the coherent state of the cache line must be tracked. The RLD 1116 contains this information. The RLD 1116 acts very similarly to a cache tag array. When an access on the MP bus 1114 occurs to that line, it checks the RLD 1116 to see if the line is present, and if it is, what action needs to be taken. Like a cache, it can be set up as direct-mapped, set-associative, and fully-associative, with similar performance traits.

If an RLD 1116 entry needs to be allocated, but the RLD is full, an entry needs to be cleared out of the RLD. This behaves like a cache evict, except the data is remote. To complete the evict, the data needs to be retrieved/invalidated. This evict can be done by issuing a probe to the agent(s) borrowing the line. If the line is Shared, a Kill command can be issued. If it is borrowed Modified, a cFlush must be issued.

Also like a cache, the large the structure, the better the performance. RLD 1116 can theoretically be a single entry as far as functionality is concerned. The larger the structure, though, the better it'll work. Its maximum size is limited by the amount of cache in all of the remote nodes that could borrow lines. The size will be determined and specified in the micro-architecture of the NC 1118.

The RLD keeps track of state based on time of access on the MP bus 1114. Because a given request for a line starts in a remote line, comes to the Home node, potentially issues probes and receives acknowledgements, and finally sends the data remote again, the RLD must be consistent in what information it is tracking. Because the ordering point in a home node is the MP bus 1114, this is the point the RLD keeps track of.

Because the RLD only tracks requests from processing nodes, the ownership is transferred to the node in either the Shared or Modified state. That state then needs to be maintained at that processing node. Because the line will be maintained in the L2 cache 1110 cache 1110, this is the place where the state of the line is maintained. It will also be the place responsible for making sure the state is appropriate within the DSM system of the invention. The L2 cache 210 cache must be inclusive of remote Modified lines in this node. If the L2 cache 210 needs to evict the line, the node needs to evict the line. Inclusivity must be maintained. The L2 cache 210 may own a copy that the CPU has evicted. So the rule is, if the CPU has the line Exclusive, the L2 cache 210 has it modified. The L2 cache 210 state does not imply any state in the CPU.

To accomplish this task, the L2 cache 1110 must always allocate remote lines when an agent does a cacheable fetch to one of them. The L2 cache 1110 will block if it doesn't have enough room. When placed into the cache, the L2 cache 1110 will mark the remote line dirty in the case of a READ_EXC allocation. If it was a READ_SHD that caused the allocation, the line will be copied in clean. Clean lines are allowed to be dropped by the L2 cache 1110. Dirty lines, though, need to be evicted.

When a dirty line is to be evicted from the L2 cache 1110, it is identified whether it is a local or remote line. If it is a local line, it is evicted normally. If it is a remote clean line, it need not be evicted at all. If it is a remote dirty line, the L2 cache 1110 must perform a WRITE_FLUSH command. The command is essentially a write to the NC 1118 of the cache line in question. Unlike a typical write, the WRITE_FLUSH will snoop the CPUs and other Level 1 agents, and if any of them hit Exclusive, they will be responsible for providing the data to the NC 1118. The L2 cache 1110 will not provide data in this case. If no agent has the line Exclusive, the L2 cache 1110 will provide the data. If any agent has it Shared, they will invalidate their copy. This instruction ensures that a line will be removed from the system entirely. It is possible the L2 cache 1110 will have a conflict in the cache and won't be able to accept an allocated remote line. In this case, the L2 cache 1110 normally throws the request into the evict buffer if it is a write. It then evicts the line to memory. In the case of a remote line being read Modified, the L2 cache 1110 will place it into the evict buffer and WRITE_FLUSH to NC. This should be rare, but it is unavoidable.

For a PROBE transaction, whether cFlush or Kill, the L2 cache 1110 must invalidate its copy of the line. It may also have to transmit the line to the NC 1116. Because this can occur before the data phase of the allocating read command, the L2 cache 1110 must remember that it is to invalidate the copy. If the L2 cache 1110 has placed a remote Modified line in its evict buffers, but hasn't gotten to the bus, a Probe must invalidate the evict buffer. If the line has been allocated in the L2 cache 1110 as Modified, this node has full ownership of the line. If a CPU does an evict of the line, it will go to the L2 cache 1110. If an agent requests the line Shared, the L2 cache 1110 will provide it a copy of the Shared line. If a READ_SHD or READ_EXC occurs on the MP bus 1114, and one of the CPUs has a copy of the line Exclusive, it will provide the data to the other agent. The L2 cache 1110 is responsible for picking up a copy of this line.

The solution to the problem is when a CPU gets a Kill command to the address it has the LL flag set for, it will invalidate the LL flag before the Store Conditional completes. Because a new command is being added to the MP bus 214 for Kills and cFlushs anyway, this command can be used. At the home node, there is a competition between the agents in the Home Node, and the external nodes. The first to make the READ_EXC command on the bus will be the one who owns the line. If it is one of the agents, Kill commands will be send to all of the other agents. If it is the NC that gets on the bus first, it will also send Kill commands to other agents, and will invalidate any copies in the It is possible the forward progress will be impaired due to any probe to a line resetting the LL flag. If the agent that won the semaphore is waiting for the data to return, a cFlush might return before the cFill (there are no ordering rules). By distinguishing the cFlush and Kill on the MP bus 1114, we should be able to guarantee forward progress. Especially since the NPC commands to the same line are serialized out of a node.

In one embodiment of the invention, the following extensions were made to the high-speed packetized HT I/O link protocol so that the link 1002 of FIG. 10 can transport the coherent instructions necessary to initiate the transactions required to implement the two-level coherency protocol. First, packetized I/O links such as HT transport I/O packets over virtual channels (VCs).

In one embodiment of the invention, this packetized I/O link is adapted to handle the coherency transactions supporting internode coherency by first adding more virtual channels to accommodate the new kinds of transactions. Second, the VCs are independently flow controlled so that if one VC is blocked, the other ones may still flow through. As a result, there is no head of line (HOL) blocking due to the congestion of any one flow. Third, packets in the same VC travel one after the other, and fragments of different packets cannot be interleaved. The semantics of the VC consists of extra end-of-packet (EOP). Finally, signaling is also permits the receivers to differentiate between the packets. Note that the packets of different VCs can be (and typically are) interleaved, depending on the unit of transfer on the underlying physical channel. Finally, additional commands to encode coherency the operations for transport over the link were implemented, and in a format that is compatible with the HT protocol.

The HT link originally provided for three virtual channels: Non-posted requests, Responses and Posted requests. The following additional virtual channels were added: Probes, Acks/WB; cFills. The following is a brief description of each virtual channel and the commands it carries.

The commands in the Probe channel query caches of remote nodes for certain cache line addresses. The line in question may be present in the Shared or Modified states in the remote cache, or not present at all. No distinction is made between Exclusive and Modified states (only Modified exists). The probe channel carries two commands, Kill and cFlush. Upon receipt of a Kill command, the remote node invalidates its copy of the line if present in the Shared state. If the line is not present, the Kill command does nothing to the cache. However, in either case, the remote node generates a KillAck command (in the Ack/WB channel) to the sender of the Kill. When a KillAck is received, the home node can safely assume that the remote node has invalidated its copy of the line. If the Kill hits a Modified line in the remote cache, an error is signaled. If the Kill hits an outstanding read-shared request (cache is awaiting the fill), a KillAck is sent and subsequent fill data invalidated after it arrives (though it is used for one instruction to allow forward progress). If the Kill hits an outstanding read-modified request, a KillAck is sent and no other action taken.

The second command in the Probe channel is the cFlush. It causes a remote cache to write back its Modified line back to the originating node. This is done by means of a cWB command in the Ack/WB channel. Along with sending the cWB, the remote node invalidates its local copy. If the line is not present in the cache, the cFlush command is ignored and nothing is sent in response to the requesting node. An error is signaled if the line is present in the remote cache in the Shared state. There is clearly a similarity between the Kill and cFlush commands. The both query remote caches for certain cache line addresses and cause them to be invalidated. However, a key difference is that while KillAck is always generated in response to a Kill, but a cWB is generated in response to a cFlush only if the line is present in the remote cache, and in the Modified (Exclusive) state.

The Acks/WB channel carries the following two commands: KillAck and cWB, as described above. In addition to the scenario described above, a cWB may also be generated when a node wishes to write back its Modified copy on its own. This write back is not in response to a cFlush from the home node, but it still results in the local copy being invalidated. There are no exceptions to this rule. KillAcks, on the other hand, are only generated as a response to a Kill.

The cFills VC is used to carry cache line fills from the home node to requesting remote nodes. Fills are generated only in response to reads and always carry one cache line worth of data (32 B). That is the only packet in this virtual channel. cFills are generated only as a response to cRdEx and cRdSh commands. All other reads are generated generate responses in the Response channel, a virtual circuit which already exists in the LDT I/O spec, regardless of whether the coherency bit in the command is set or not. There is only one type of cFill command, used for both flavors of coherent reads.

The foregoing are all of the new commands required to extend the HT specification to implement the two-tiered coherency protocol of the invention. The table of FIG. 14 summarizes these commands, along with the virtual channel through which they are transported over the HT link 1002 of FIG. 10. The number of virtual channels and the assignment of the commands thereto, are intended to avoid any dependencies between the new commands and the established commands and resources available to transport the commands over the link 1002. Put another way, the number of virtual channels established to accommodate the new commands are such that no deadlocks will occur during operation of the DSM system of the invention.

It is desirable to implement the foregoing new commands using the format of the existing commands already specified by the HT specification. In one embodiment, the commands listed above are implemented as only one additional command, which indicates that it is a coherency command. The actual command can be encoded in bits [2:4] of bit time 3. This corresponds to Address [2:4] for request packets, and reserved bits [2:4] in bit time 3 of response packets. Which format to use is determined by the command itself (cFill is the only one with response format). The Count field is used for NodeID, because data size is implicitly 32 B. To support other data sizes, the PassPW and Compat bits in request packets can be used. This doesn't allow arbitrary data size, but allows data size to be picked from pre-determined sizes. The SeqId field may be used if specifying exact data size is required. Ordered sequences are not expected within a VC. In response packets, PassPW and Isoc. bits can specify data size because they are otherwise unused, as are a number of other reserved bits.

The benefits of structuring the new commands in the foregoing manner are that only one new command is created, the same bits are looked at for all new packets for command, the same bits looked at for all new packets for NodeID. However, this approach sacrifices some scalability. There is room for only 8 total commands. Removing NodeID provides for more room for expansion. SeqId, PassPW and Compat fields are also potentially available for use.

A second embodiment of an implementation of the new coherency commands within the existing format is that all packets, including cFills, have the request packet format. Addr[4:2] encodes the command. RdSh and RdEx travel in the NPC channel, but are treated specially as follows: The SrcTag field is ignored. Unlike usual NPC reads, the tag is not remembered or renamed by intermediate devices. It must be forwarded unaltered with the packet, since it is needed at the destination. This makes the reads looks like posted commands. Routing of the cFill is achieved by the sender of the data translating the requestor's NodeID (part of the request packet) into an address which goes into the command packet of the cFill. All packets have the same format and tag routing of cFills as required in the first approach is eliminated. The NodeID is already needed in the packet for recording into the RLD, so this solution doesn't add any additional requirements.

Non 32 B data sizes are supported as in the previous embodiment. Only one command is added to the HT specification, with fixed format and no reserved bits used. Only eight different commands are implemented. This embodiment creates a special case for cRdSh and cRdEx in the NPC virtual channel to not use SrcTag. FIGS. 15*a–d* illustrate the formatting in accordance with this embodiment of the invention.

A third embodiment could have two additional commands, one to indicate commands with address field and one without. For the ones with address field, use Address [4:2] which correspond to [4:2] in bit time 3. For the ones without an address field, use some other unused bits in the packet. The advantage of this approach is that it doesn't use reserved bits, if that is important (see Note at the end of the section). It also increases the total number of commands available because of the extra command (but only responses, really).

This embodiment allows for 8 request format and 2N response commands if the filed Addr[4:2] is used for requests and N bits for responses. It also uses two command encodings from the HT specification and has no ability to supply count for response (non-address) packets.

As previously discussed, it is critical to the optimal performance of the link that the flow of packets through each of the virtual channels be controlled. Packets should only be transported over the link when there is sufficient buffer space with which to receive them at their destination. Thus, the HT protocol calls for the transmission of buffer free messages that indicate to a source when and how much free buffer space there is at the receiving end of the virtual channels.

Thus, for the extensions of the number of virtual channels, there must be additional flow control messages by which buffer free information can be provided for the new coherency virtual channels that have been added. One embodiment of the invention includes the format for a flow control packet that provides for a maximum number of additional virtual channels that can be supported. The embodiment includes an Extended Buffer Free command that takes up one of the unused six bit encodings in the command space (note: only one other command has been added for the new coherency transactions). The flow control packet is 8 Bytes in length, and like the legacy NOP command, doesn't belong to any virtual channel. A receiver must always be able to accept this packet. Upon receiving the Buffer Free packets, the source node decrements a counter for each of the coherent virtual channels in accordance with the amount of buffer space that has been freed up. The counters are incremented each time the source node transmits a packet in that virtual channel, and will cease transmitting packets when the buffer limits at the target node have been exceeded.

The format of the new packet is shown in FIG. 16. Bits [5:0] of the first byte encode the Extended Buffer Free command, while the remaining two bits indicate which category of virtual channels to which this packet refers. In one embodiment, one category of extended virtual channels would be for the HT coherency transactions. Thus, the embodiment can have up to four classes of extra virtual channels. The next 5 bytes of the packet encode the number of buffers freed per virtual channel for 20 channels in that class. Anywhere from 0 to 3 buffers can be freed, and the correspondence of channel to number freed is done by location in the packet. Bits[0:1] in bit time 2 refer to VC0, bits[2:3] refer to VC1, and so on. At the end of the buffer free area, bits[6:7] in bit time 5 correspond to VC 19. The last two bytes of the packet are reserved for future use.

It is possible to use the bits in the packet differently, i.e. use two bits for the number of buffers freed but have 28 virtual channels per packet, for a total of 28*4=112 total virtual channels. With the current proposal, 18*4=72 extra virtual channels can be supported. An alternative embodiment is to explicitly list the VC# and number of buffers freed in the buffer free packet. Assuming 5 bits to encode the VC# and 3 bits for number of buffers freed, the total VC count with this approach is 32*4=128. In a given cycle, 7 VC's can send buffer free messages which ought to be enough. From the receiver's hardware point of view, this requires seven comparators per VC (each VC counter at the receiver has to compare incoming VC #'s to see if it needs to be updated). If a 4 Byte packet is used, 3 VC's can send buffer free messages. If a buffer in an extended VC is freed, it implies one command and a 64-byte data buffer were freed. Thus for coherency transactions, it is enough to exchange buffer free messages for 4 VCs, a command buffer for each VC and data buffer for the Ack/WB VC.

One additional adaptation to a packetized I/O link like HT and contemplated by the present invention is to a capability table. The capability table is used in devices that are designed to meet the HT specification to provide the other chips in the system knowledge of the HT capabilities possessed by the chip. This is primarily due to the fact that a there are a number of circuits in the field that have enhancements, while another may have minimal HT capabilities.

Figure 17:
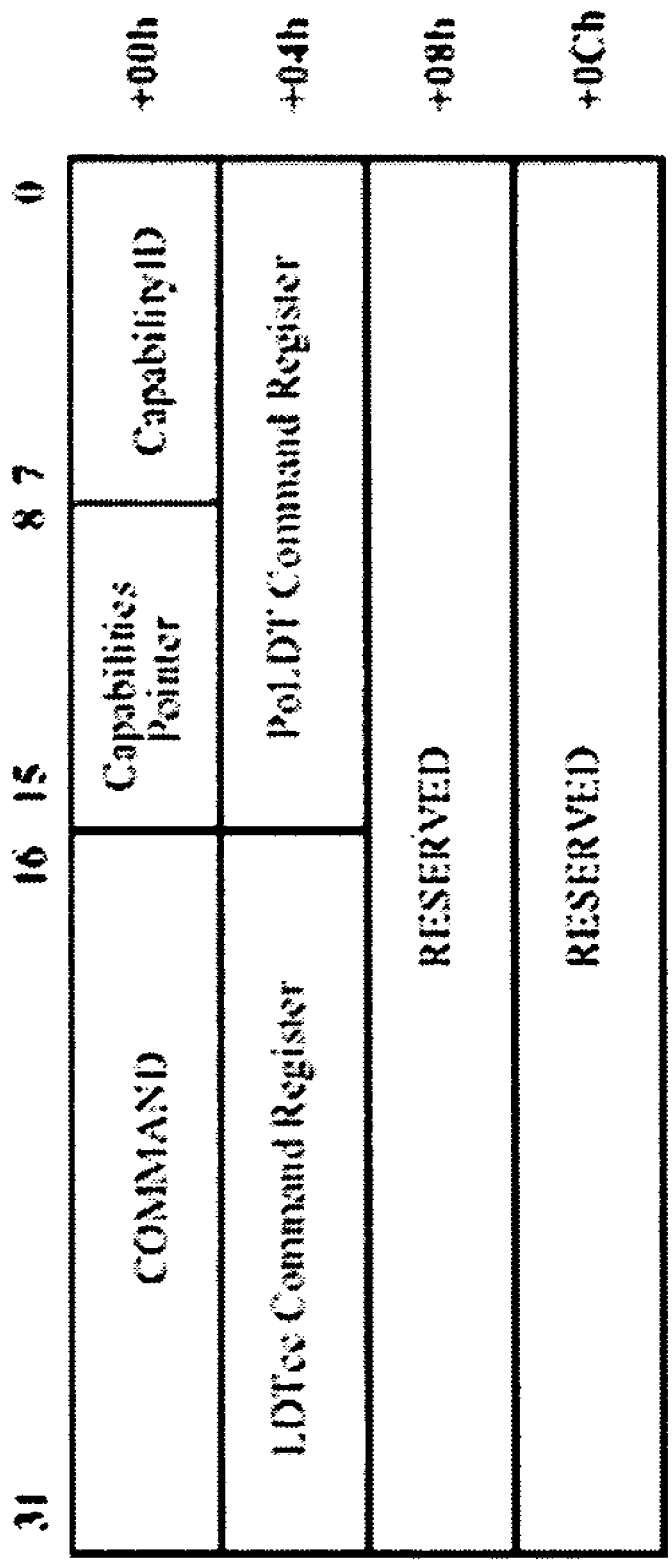
FIG. 17 is a table illustrating the format for an HT Capability table of the present invention.

In one embodiment, a new type of capability block is implemented that is an improvement over existing capabilities. Currently, HT devices have two types of capability blocks, primary and secondary. A third one, called switch capability, is under development by API. They might also add a fourth for interrupts. The new capability block is one in which extended (i.e. customized capabilities) can be described. The format of this block is shown in FIG. 17. The fields of this block are described below in conjunction with FIG. 17.

The capability field indicates that the device is an HT device, capability 08 h. The same value is used by primary, secondary and switch capability blocks. It would have a capability pointer to the next capability in the linked list of capabilities. All capability types have one value. A Command Bits [15:13] field is included that defines the capability type. The capability type in turn determines the format for the remaining bits of the register, and the rest of the capability block. Command bits field [15:13] is used as to store a declaration of custom capability.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A shared memory system comprises:
    a plurality of processing nodes, wherein each of the plurality of processing nodes includes a processing resource, cache memory, and memory; and
    a packetized input/output (I/O) link operably coupling the plurality of processing nodes together, wherein one of the plurality of processing nodes is operably coupled to:
        initiate coherent memory transactions such that another one of plurality of processing nodes has access to a home memory section of the memory of the one of the plurality of processing nodes;
        facilitate transmission of a coherency transaction packet between the memory of the one of the plurality of processing nodes and the another one of the plurality of processing nodes over the packetized I/O link;
        maintain intranode cache coherency at a symmetric multiprocessor (SMP) level; and
        maintain intranode cache coherency among the plurality of processing nodes at a non-uniform memory access (NUMA) level.

2. The shared memory system of claim 1, wherein each of the plurality of processing nodes further comprises:
    an address map that specifies areas of the memory that are the home memory section and areas of the memory that are remote memory sections.

3. The shared memory system of claim 1, wherein the one of the plurality of processing nodes further functions to:
    provide data in either a shared or a modified form to the another one of the plurality of processing nodes.

4. The shared memory system of claim 1, wherein the one of the plurality of processing nodes initiates the coherent memory transactions by:
    receiving a request from the another one of the plurality of processing nodes for at least one line of the home memory section; and
    in response, determining coherency of the request, wherein the coherency includes modified, exclusive, shared with read/write privileges, shared with read-only privilege, or invalid.

5. The shared memory system of claim 4, wherein the one of the plurality of processing nodes is further operably coupled to:
    when the coherency is the exclusive or the shared with read/write privileges, transfer ownership of the at least one line of the home memory section to the another one of the plurality of processing nodes.

6. The shared memory system of claim 4, wherein the one of the plurality of processing nodes is further operably coupled to:
    when the coherency is the modified or the shared with read-only privileges, maintaining ownership of the at least one line of the home memory section and providing read only access to the at least one line of the home memory section.

* * * * *